United States Patent [19]

Markley et al.

[11] Patent Number: 4,610,779

[45] Date of Patent: Sep. 9, 1986

[54] PROCESS FOR THE HYDROGENATION OF AROMATIC HYDROCARBONS

[75] Inventors: Gerald E. Markley; James C. Spry, Jr., both of Baton Rouge, La.

[73] Assignee: Exxon Research and Engineering Co., Florham Park, N.J.

[21] Appl. No.: 658,375

[22] Filed: Oct. 5, 1984

[51] Int. Cl.$^4$ .................. C10G 45/00; C07C 5/10
[52] U.S. Cl. .................. 208/212; 208/143; 585/266; 585/269; 502/53
[58] Field of Search .......... 208/143, 211, 212; 585/266, 269; 502/53

[56] References Cited

U.S. PATENT DOCUMENTS

| | | | |
|---|---|---|---|
| 1,894,785 | 1/1933 | Peck | 208/143 |
| 2,906,784 | 9/1959 | Dean et al. | 208/211 |
| 3,048,536 | 8/1962 | Coonradt et al. | 208/110 |
| 3,132,090 | 5/1964 | Helfrey et al. | 208/89 |
| 3,254,021 | 5/1966 | Mason et al. | 502/53 |
| 3,304,338 | 2/1967 | Parish | 208/143 |
| 3,527,695 | 9/1970 | Lawrance et al. | 208/143 |
| 3,607,728 | 9/1971 | Wilhelm | 585/269 |
| 3,655,551 | 4/1972 | Hass et al. | 208/254 H |
| 3,779,899 | 12/1973 | Mears | 585/269 |
| 3,781,199 | 12/1973 | Ward | 208/89 |
| 3,865,716 | 2/1975 | Sosnowski | 208/255 |
| 3,943,053 | 3/1976 | Kovach et al. | 585/266 |
| 3,945,943 | 3/1976 | Ward | 502/66 |
| 4,104,152 | 8/1978 | Hilfman | 208/143 |
| 4,240,900 | 12/1980 | Gilbert et al. | 208/264 |

FOREIGN PATENT DOCUMENTS 838751 6/1960 United Kingdom ............... 208/143

Primary Examiner—Andrew H. Metz
Assistant Examiner—Helane Myers
Attorney, Agent, or Firm—Marhte L. Gibbons

[57] ABSTRACT

A process for the hydrogenation of aromatic hydrocarbons contained in hydrocarbonaceous oil feed comprising at least about 15 wppm organic nitrogen compounds is provided in which the feed is contacted with hydrogen in a substantially sulfur-free environment in the presence of a catalyst comprising a Group VIII noble metal component, such as palladium, a Y-type crystalline aluminosilicate zeolite and a support such as alumina. When the hydrogenation activity of the catalyst decreases, the partially deactivated catalyst is stripped with hydrogen periodically to increase the hydrogenation activity of the catalyst.

12 Claims, 1 Drawing Figure

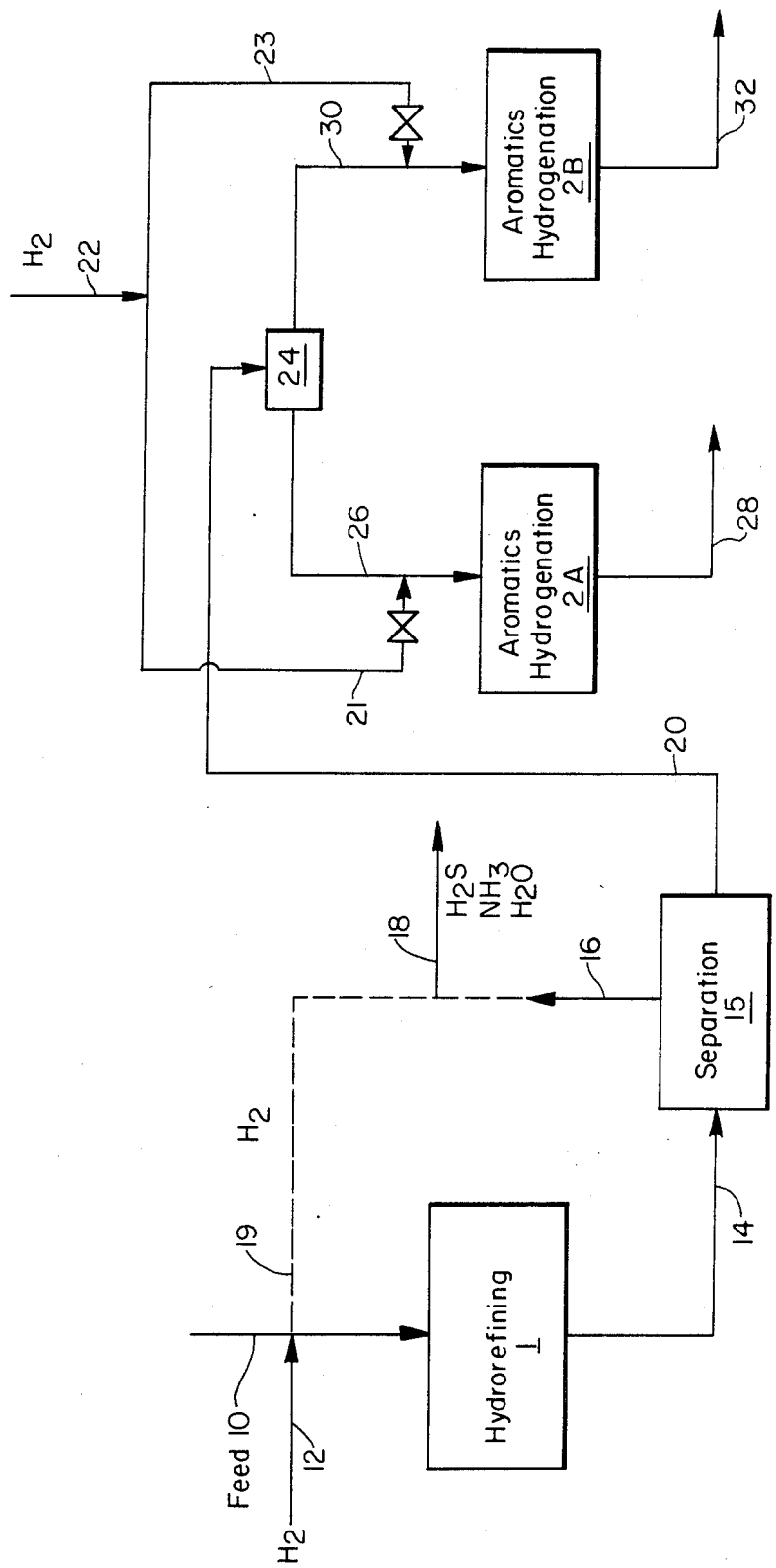

PROCESS FOR THE HYDROGENATION OF AROMATIC HYDROCARBONS

BACKGROUND OF THE INVENTION

1. Field of the Invention

The present invention relates to a process for the hydrogenation of aromatic hydrocarbons.

2. Description of the Prior Art

Hydrogenation processes in which aromatic compounds alone or contained in hydrocarbonaceous oils are hydrogenated in the presence of hydrogen and a suitable catalyst are known.

U.S. Pat. No. 3,655,551 discloses that Group VIII noble metals, such as palladium or platinum, on zeolites exhibit high hydrogenation activity such that if a substantially sulfur-free atmosphere is maintained, effective hydrogenation of aromatics can occur at 200° to 500° F., pressures of 500 to 3000 psig and a space velocity of 0.5 to 2.0 and those conditions may be correlated such that little or no cracking occurs (see col. 2, lines 29–34). A reversible poison such as ammonia may be added to the feed being hydrogenated to further repress the cracking activity of the catalyst (see col. 8, lines 58–65 and col. 1, lines 39–45).

U.S. Pat. No. 3,132,090 discloses a 2-stage cyclic hydrocracking process utilizing a catalyst that may comprise palladium-Y zeolite in the second stage. The hydrogen sulfide concentration in the second stage is adjusted to be alternatively high or low to operate the second stage at sour or sweet conditions. The sweet second stage is operated at a hydrogen sulfide concentration of less than 0.2, preferably less than 0.01 millimole hydrogen sulfide per mole hydrogen to maximize jet fuel and diesel fuel production.

U.S. Pat. No. 3,527,695 discloses a process for hydrogenation of aromatic hydrocarbons in feedstocks boiling within the range of 35° to 125° C. in the presence of a catalyst comprising palladium incorporated with a crystalline zeolite, preferably Y zeolite. For maximum hydrogenation activity, the sulfur content of the feed is desirably 0.1 to 10 wppm. The feed may be subjected to catalytic hydrodesulfurization prior to the hydrogenation.

U.S. Pat. No. 3,405,056 discloses use of a Y-type zeolite combined with a noble metal such as palladium (column 2, line 69 to column 3, line 4). The coked partially deactivated catalyst is used for hydrocracking under sweet conditions.

U.S. Pat. No. 3,779,899 discloses the use of platinum on a stablized Y zeolite (i.e. ultrastable Y zeolite) for hydrogenation of aromatic hydrocarbons, particularly monocyclic hydrocarbons without substantial hydrocracking.

U.S. Pat. No. 3,781,199 discloses a hydrocracking process utilizing an ammonia stable hydrocracking catalyst comprising a Group VIII metal hydrogenation component composited with a stabilized (i.e. ultrastable) Y type crystalline aluminosilicate zeolite and an inorganic oxide component. A hydrocarbonaceous feed containing less than 10 wppm organic nitrogen in admixture with ammonia is hydrocracked with the ammonia resistant catalyst.

It has now been found that aromatic hydrocarbon streams comprising at least 15 wppm (weight parts per million) organic nitrogen contaminants can be hydrogenated with the noble metal-containing zeolitic catalyst if the partially deactivated catalyst is subjected to hydrogen stripping at least periodically.

SUMMARY OF THE INVENTION

In accordance with the invention there is provided, a process for the hydrogenation of aromatic hydrocarbons, which comprises: (a) contacting an aromatic hydrocarbon feed comprising at least about 15 wppm organic nitrogen compounds, calculated as elemental nitrogen, based on said feed, at hydrogenation conditions, in a hydrogenation zone, in the presence of added hydrogen and in the substantial absence of an inorganic sulfur compound, with a catalyst comprising a Group VIII noble metal component and a Y-type crystalline aluminosilicate zeolite, for a time sufficient to decrease the hydrogenation activity of said catalyst, and (b) contacting the resulting partially deactivated catalyst with a hydrogen-containing gas at conditions and for a time sufficient to increase the hydrogenation activity of said partially deactivated catalyst.

BRIEF DESCRIPTION OF THE DRAWINGS

The FIGURE is a schematic flow plan of one embodiment of the invention.

DETAILED DESCRIPTION OF THE INVENTION

Feeds

The hydrogenation process of the present invention is suitable to hydrogenate aromatic hydrocarbon streams comprising at least about 15 wppm, preferably at least 20 wppm, more preferably at least 25 wppm, organic nitrogen compounds, calculated as elemental nitrogen, based on the weight of the aromatic hydrocarbon stream. The organic nitrogen-containing feed stream may comprise a single type or mixture of types of aromatic hydrocarbons as well as aromatic hydrocarbons contained in a mixture of hydrocarbons such as hydrocarbonaceous oil feeds. The aromatic-containing hydrocarbonaceous oils may be derived from any source such as petroleum, shale oil, tar sands oil, coal liquefaction product and mixtures thereof. Preferably, the hydrocarbonaceous oil feed comprises at least about 20 weight percent aromatic hydrocarbons. Suitable aromatic-contaning hydrocarbonaceous oils include oils having atmospheric pressure boiling points ranging from about 300° to about 1050° F., preferably from about 450° to 1050° F. More preferably, the feeds used for the hydrogenation stage of the present invention have a low organic sulfur content under 0.1 weight percent sulfur calculated as organic sulfur compounds. If the organic sulfur content is not low enough, the sulfur content can be lowered by pretreating the hydrocarbonaceous oils utilizing a hydrotreating catalyst and hydrogen and hydrotreating conditions and using the hydrotreated oil as feed for the aromatic hydrogenation stage of the present invention. The hydrotreating step may also lower the organic nitrogen content of the oil.

The Aromatics Hydrogenation Catalyst

The catalyst used for the aromatic hydrocarbon hydrogenation stage of the present invention comprises a Group VIII noble metal component, a Y-type crystalline aluminosilicate zeolite and a non-zeolitic inorganic oxide matrix or binder. By "noble metal" is intended herein a metal of Group VIII of the Period Table of Elements selected from the group consisting of Ru, Rh, Pd, Os, Ir, Pt, and mixtures thereof. The Periodic Table of Elements referred to herein is in accordance with the *Handbook of Chemistry and Physics,* Chemical Rubber Publishing Company, Cleveland, Ohio 45th edition, 1964. By "Y-type" zeolite is intended herein a zeolite having the crystal structure of faujasite and a silica to alumina mole ratio of at least 3:1.

Suitable zeolites are Y-type zeolites, naturally occurring or synthetically prepared, having silica to alumina mole ratios of at least about 3 and uniform pore openings ranging from about 6 to about 15 angstroms. Preferably, the Y-type zeolite is an ultrastable Y-type zeolite. Ultrastable Y-type zeolites are described, for example, in U.S. Pat. No. 3,293,192; U.S. Pat. No. Re. 28,629 (reissue of U.S. Pat. No. 3,402,996); U.S. Pat. No. 3,781,199 and U.S. Pat. No. 3,929,672. In general, "ultrastable" with reference to the Y-type zeolite refers to a zeolite which is highly resistant to degradation of crystallinity by high temperature and steam treatment and which has a unit cell size not greater than about 24.5 angstroms. Suitable non-zeolitic inorganic oxide components include, silica, alumina, boria, chromia, zirconia, magnesia, titania and mixtures thereof. Clays comprising silica and alumina, and acid treated clays may also be used as non-zeolitic inorganic oxide component of the catalyst. Preferably, the non-zeolitic inorganic oxide is essentially alumina. The zeolite may be present in the catalyst in an amount ranging from about 0.5 to 98 weight percent, preferably from about 2 to about 80 weight percent, based on a total catalyst. The Group VIII metal component, calculated as elemental metal, may be present from about 0.1 to about 4 weight percent, based on a total catalyst. The preferred catalyst comprises palladium composited with an ultrastable Y-type zeolite and alumina, most preferably a catalyst comprising about 80 weight percent ultrastable Y-type zeolite, about 20 weight percent alumina, 0.5 weight percent palladium based on the total catalyst, such as the catalyst described in U.S. Pat. No. 3,926,780; 3,945,943; 3,781,199, the teachings of which are hereby incorporated by reference.

Suitable aromatic hydrogenation conditions are summarized in Table I.

TABLE I

| Hydrogenation Conditions | | |
|---|---|---|
| Conditions | Broad Range | Preferred Range |
| Temperature, °F. | 200–600 | 350–500 |
| Total Pressure, psig | 200–2500 | 350–2000 |
| Liquid Hourly Space Velocity (V/V/HR) | 0.4–7.0 | 1.5–4.0 |

TABLE I-continued

| Hydrogenation Conditions | | |
|---|---|---|
| Conditions | Broad Range | Preferred Range |
| Hydrogen Rate SCF/Bbl | 200–25,000 | 400–8000 |

The hydrogenation zone is substantially free of inorganic sulfur compounds such as hydrogen sulfide. By "substantially hydrogen sulfide free" is intended herein hydrogen sulfide partial pressure of less than about 0.5 psia.

The hydrogenation catalyst may be maintained in a fixed bed, moving bed, ebullating bed, fluidized bed, dispersed phase (transfer line) slurry process, etc.

Suitable hydrogen stripping conditions are summarized in Table II.

TABLE II

| Hydrogen Stripping Conditions | | |
|---|---|---|
| Conditions | Broad Range | Preferred Range |
| Temperature, °F. | 400–1200 | 600–900 |
| Hydrogen Partial Pressure, psig | 200–2500 | 350–2000 |
| Total Pressure, psig | 200–2500 | 350–2000 |
| Hydrogen-containing gas rate, SCF per CF of catalyst per hr. | 10–10,000 | 20–6000 |
| Time, hours | >0.25 | 1–72 |

DESCRIPTION OF THE PREFERRED EMBODIMENT

Referring to the FIGURE, the hydrocarbonaceous oil feed comprising aromatic compounds, organic sulfur compounds, and more than 15 wppm organic nitrogen compounds calculated as elemental nitrogen, is passed by line 10 in admixture with a hydrogen-containing gas introduced by line 12 into hydrorefining stage 1 in which is maintained a conventional hydrorefining catalyst. The hydrorefining stage is used herein as a pretreatment stage to decrease the organic sulfur content of the oil as well as to hydrogenate diolefins that may be present in the oil. The organic nitrogen content may also decrease in the hydrorefining stage.

The conditions and duration of the treatment are such that the hydrorefined oil still has at least 15 wppm organic nitrogen. Suitable operating conditions in the hydrorefining stage are summarized in Table III.

TABLE III

| Hydrorefining Operating Conditions | | |
|---|---|---|
| Conditions | Broad Range | Preferred Range |
| Temperature, °F. | 400–800 | 500–700 |
| Total Pressure, psig | 50–2500 | 60–1500 |
| Liquid Hourly Space Velocity, (V/V/HR) | 0.05–20 | 0.1–2.5 |
| Hydrogen Rate, SCF/Bbl | 200–15,000 | 500–8000 |

The hydrogen-containing gas introduced into feed line 10 by line 12 may be a fresh hydrogen-containing gas at the start of the process or it may be a hydrogen-containing gas recovered from the process i.e. recycled hydrogen-containing gas from which hydrogen sulfide contaminants have been removed.

The Hydrorefining Catalyst

The hydrorefining stage catalyst may be any conventional hydrorefining catalyst that does not comprise a noble metal component. Hydrorefining catalysts generally comprise a hydrogenation component and a support. Suitable hydrorefining catalysts for the hydrorefining stage of the present invention comprise a Group VI metal component or non-noble metal component of Group VIII and mixtures thereof of the Periodic Table of Elements such as cobalt, molybdenum, nickel, tungsten and mixtures thereof, preferably their sulfides, their oxides and mixtures thereof. Suitable supports include inorganic oxides such as alumina, amorphous silica-alumina, zirconia, magnesia, boria, titania, chromia, beryllia, and mixtures thereof. Preferably the support will be non-zeolitic, although low zeolite content catalysts having less than 20 weight percent zeolite on total catalyst may be used such as those described, for example, in U.S. Pat. No. 3,865,716. The preferred catalyst comprises sulfides of nickel and molybdenum composited with an alumina support. When the hydrogenation component is in the oxide state, the catalyst may be sulfided prior to use, as is well known in the art. The hydrorefining stage effluent is passed by line 14 into separation zone 15 in which the effluent is separated into a normally gaseous product comprising hydrogen, hydrogen sulfide, ammonia, and $H_2O$ and which may also comprise light hydrocarbons, and a normally liquid hydrocarbonaceous oil which comprises aromatics initially present in the feed to the hydrorefining stage as well as aromatics that may have been produced in the hydrorefining stage. The gaseous product is removed by line 16. If desired, after removal of hydrogen sulfide and ammonia by conventional means as is well known in the art, the hydrogen-containing gas may be recycled via line 19 to feed line 10 for reintroduction into the hydrorefining stage. The hydrorefined normally liquid hydrocarbonaceous oil comprising at least 15 wppm organic nitrogen is removed from separation zone 15 via line 20. A switching valve is indicated at 24. This valve is of the type known for use in swing reactors, and is used to switch the introduction of hydrorefined oil recovered from separation zone 15 either into aromatics hydrogenation zone 2A via line 26 or into aromatics hydrogenation zone 2B via line 30. A hydrogen-containing gas carried in line 22 can be introduced into line 26 by line 21 and into line 30 by line 23. Shut off valves or other regulatory devices are located in lines 21 and 23 and may also be located in the hydrorefined oil lines. The hydrogen-containing gas of line 22 may be a substantially $H_2S$-free recycle gas stream recovered from the process or it may be a fresh hydrogen-containing gas which is substantially $H_2S$-free. At least a portion of the hydrorefined oil recovered from separation zone 15 in admixture with the hydrogen-containing gas is introduced either into aromatics hydrogenation stage 2A or aromatic hydrogenation stage 2B. A catalyst is maintained in hydrogenation stage 2A and 2B. The catalyst comprises a palladium component (as hydrogenation component) composited with an ultrastable Y-type zeolite having a unit cell size below about 24.5 Angstrom and an alumina support. The alumina support may comprise a minor amount of silica. The palladium component may be ion exchanged in the zeolite or deposited on the zeolite or deposited on the composite catalyst particle. The preferred catalyst for use in the present invention comprises 0.5 weight percent palladium component, calculated as elemental metal; 80 weight percent zeolite; the balance being alumina and all the weights being based on the weight of the total catalyst.

Suitable operating conditions in aromatic hydrogenation zone 2A or 2B to maximize hydrogenation of aromatic hydrocarbons to aliphatic hydrocarbons such as, for example, cycloalkanes (e.g. naphthenes) are given in Table IV.

TABLE IV

Sweet Hydrogenation Conditions

| Conditions | Broad Range | Preferred Range |
|---|---|---|
| Temperature, °F. | 200–600 | 350–500 |
| Total Pressure, psig | 200–2500 | 1200–2000 |
| Liquid Hourly Space Velocity, (V/V/HR) | 0.4–7 | 1.5–4.0 |
| Hydrogen Rate SCF/Bbl | 200–25,000 | 400–8000 |
| $NH_3$ Partial Pressure, psia | less than 0.5–1.0 | less than 0.25 |
| $H_2S$ Partial Pressure, psia | less than 0.5 | less than 0.05 |
| $H_2$ Partial Pressure psia | 150–2000 | 250–2000 |

The hydrogenation stage is operated substantially free of hydrogen sulfide, that is, under so-called sweet conditions to maximize hydrogenation of aromatics present in the oil and under conditions to minimize cracking of the oil to lower boiling products, that is, for example to convert less than 20 volume percent of the oil of the second stage to products boiling below 350° F. The effluent of the hydrogenation stage 2A is removed by line 28. When reactor 2B is used, the oil to be hydrogenated and hydrogen are introduced by line 30 and the hydrogenated effluent is removed by line 32. The hydrogenation stage effluent comprises a gaseous phase, including hydrogen which may be recycled to the second or first stage of the process and a liquid hydrogenated oil product having a decreased amount of aromatics relative to the aromatics that were present in the oil introduced into the hydrogenation stage.

When the aromatics hydrogenation catalyst described above is used with feed containing at least 15 wppm organic nitrogen compounds, the hydrogenation activity of the catalyst decreases, that is, becomes partially deactivated. In accordance with the present invention, the partially deactivated (lowered hydrogenation activity) catalyst, after a predetermined partial deactivation level, is subjected to hydrogen stripping to increase the hydrogenation activity of the catalyst and to produce a reactivated catalyst. The hydrogen stripping is conducted at least periodically by stopping the flow of aromatic hydrocarbon feed to the catalyst and contacting the partially deactivated catalyst with a hydrogen-containing gas for a time sufficient to increase the hydrogenation activity of the catalyst. When the hydrogenation activity of the catalyst has decreased to a predetermined level, for example, when its activity is 60 percent less than its initial activity, the flow of oil is switched into hydrogenation reactor 2B while continuing the flow of hydrogen-containing gas into hydrogenation reactor 2A for a time sufficient to increase the hydrogenation activity of the catalyst, that is, for 0.25 to 72 hours at the hydrogen stripping conditions given in Table II to contact the partially deactivated catalyst. After the catalyst is reactivated, the aromaic hydrocarbon-containing oil is again introduced into aromatics hydrogenation zone 2A while hydrogen stripping is taking place in aromatics hydrogenation zone 2B. The stripping is performed intermittently, that is periodically as desired to maintain a given level of hydrogenation activity of the catalyst.

The following examples are presented to illustrate the invention.

EXAMPLE 1

Experiments were made utilizing a catalyst designated "Catalyst A" having the following properties:

| CATALYST A | |
|---|---|
| Noble Metal | Pd |
| Noble metal wt. % on total catalyst | 0.5 |
| Zeolite | Ultrastable Y[1] Type |
| Zeolite, wt. % on total catalyst | 80 |
| Alumina, wt. % (e.g. non-zeolitic inorganic oxide) | Balance |

[1]Unit cell size not greater than about 24.5 Angstroms

In Example 1, a hydrocarbon oil having a boiling range of 350°–700° F. was hydrotreated over a conventional NiMo catalyst during which time sulfur and nitrogen contaminant levels were reduced to approximately 25 ppm and less than 1 ppm, respectively. Following treatment, the aromatics level was 40 LV%. Catalyst A was dried in hydrogen in preparation for the second stage hydrogenation of the hydrorefined feed. The catalyst was lined-out on this feed for a period of approximately 55 days at 1200 psig conditions during which hydrogenation and cracking activity were both stable, although some long-term deactivation was gradually taking place. Actual operating conditions varied somewhat due to the nature of the run (a process-variable scoping run) but the range of conditions employed during the 55-day line-out period are given in Table V.

TABLE V

| | Operating Conditions | |
|---|---|---|
| Line-out Conditions | EXAMPLE 1 | EXAMPLE 2 |
| Temperature, °F. | 425–470 | 425–470 |
| Total Pressure, psia | 1200 | 920 |
| LHSV (V/V/Hr) | 1.6–2.3 | 1.0–1.5 |
| Treat gas rate, SCF/B H$_2$ | 4000 | 4000 |
| Hydrogen Strip Conditions | | |
| Temperature, °F. | 700 | 700 |
| Total Pressure, psia | 1200 | 920 |
| Hydrogen | | |
| Purity, mole % | 100 | 100 |
| Flowrate, SCF/cu ft cat/hr | 1250 | 800 |
| Length of Treatments, hours | 16 | 16 |

TABLE V-continued

| | Operating Conditions | |
|---|---|---|
| Line-out Conditions | EXAMPLE 1 | EXAMPLE 2 |
| Number of Treatments performed | 3 | 2 |

At the end of the line-out period, hydrogenation activity, as measured by the hydrogenation rate constant, had lined-out to a value of approximately 3.0, while cracking activity, roughly measured by % conversion of material boiling above 320° F. to below 320° F. was approximately 26%.

After the 55 days on oil, a portion of the feedstock was spiked with n-butyl amine in an amount equivalent to 6 ppm nitrogen, calculated as elemental nitrogen (N). This feed was introduced to the unit for an 8-day period during which hydrogenation activity gradually declined from 3 to approximately 1.7. At the end of the 8-day period, the feed was further spiked to a nitrogen level of 32 ppm again using n-butyl amine. This feed was then immediately introduced to the unit for an approximate 6-day period. During this time, hydrogenation activity declined from a rate of about 2.0 to about 0.6. Although the decline in hydrogenation activity was pronounced over the entire two-week period of operation on the spiked feed, the activity averaged approximately 1.4. This is still a good deal higher than what could be expected for single-stage activities. More importantly, the activities experienced during the first week of operation on spiked material were approximately 1.7 or above, and during 4 days of subsequent operation on 32 ppm nitrogen feed were 1.1 or above. These data indicate that high activity can be maintained for a period of at least a week during exposure to nitrogen levels of 5 to 10 ppm and can be maintained for at least several days following exposure to even greater nitrogen levels of >25 ppm.

After 6 days of operation on 32 ppm nitrogen feedstock when hydrogenation activity declined to 0.6, all feed was removed from the unit. The catalyst was then stripped for an overnight period (16 hours) in hydrogen flowing at a rate of 1250 SCF H$_2$ per cubic foot of catalyst per hour at 700° F. Following this overnight stripping period, unspiked feed was reintroduced to the catalyst. Hydrogenation activity immediately recovered to a level of 3.0. After being back on oil for two-days, a second hydrogen strip was performed overnight at the same conditions as the first strip. Again, unspiked feed was re-introduced to the unit. Again hydrogenation activity improved to a level of 3.6. This time the feed was allowed to flow to the unit for a period of approximately 10 days during which a slow but preceptible decline occurred in hydrogenation activity to about 3.4. (This could have been due to residual amounts of nitrogen still present in the unit.) Again, an overnight hydrogen treatment was performed at the conditions specified above. A brief activity check using the unspiked feed again showed an increase in hydrogenation activity this time to approximately 4.1. Cracking activity, as measured by conversion of 320+° to 320−° F., was greatly reduced by the combination nitrogen-poisoning/hydrogen stripping treatment. Even after the repeated hydrogen stripping, conversion levels were always well below 10%.

EXAMPLE 2

A fresh charge of the catalyst A was similarly prepared and lined-out for a 55-day period using the same hydrotreated low-nitrogen feedstock. In this example, except for a two-week period of 1200 psig operation at the beginning of the run, catalyst line-out took place at 920 psig conditions. A summary of the operating conditions employed in Example 2 is also shown in Table V.

Following line-out on the low-nitrogen feedstock, the catalyst was exposed to the same 6 ppm nitrogen feed as was prepared in Example 1. Over an 8-day period of exposure, hydrogenation activity declined from approximately 2.1 to 1.5.

At the end of the 8-day period, the feed elemental nitrogen level was increased to 32 ppm by spiking with n-butyl amine. This spiked version of the feedstock was then introduced to the catalyst for a period of about 6 days during which hydrogenation activity declined from a level of about 1.7 to 0.8. Again, although the activity decline on the spiked feedstock was noticeable, the average hydrogenation activity experienced while operating, for example, on 6 ppm nitrogen feedstock was about 1.7. During the 8 days of operation on 6 ppm nitrogen feedstock, hydrogen activity was never below 1.4, while for the first 4 days of subsequent operation on 32 ppm nitrogen feedstock, hydrogenation activity was never below 1.2. These data support the findings of Example 1 and show that high activity can be maintained for a period of at least a week during exposure to nitrogen levels of 5 to 10 ppm and can be maintained for at least several days following exposure to even greater nitrogen levels of >25 ppm.

Following operation on spiked feedstock, an overnight (16 hour) hydrogen strip was performed at 700° F. using pure hydrogen flowing at a rate of 800 SCF $H_2$ per cubic foot of catalyst per hour. After this treatment, low nitrogen feedstock was re-introduced to the unit and hydrogenation activity immediately returned to the 2.0 level observed before the spiking studies. After two days of such operation, a second hydrogen strip was performed at the same conditions and for the same duration as the first treatment. Again, the unspiked feedstock was re-introduced to the unit. Hydrogenation activity initially improved to about 2.5 but over the next 10 days on-oil declined slowly to about 1.9 (the presence of residual amounts of nitrogen still left in the unit cannot be ruled out). As in Example 1, after repeated hydrogen stripping treatments, conversion of 320+° F. to 320−° F. was still well below 10%.

The activities of catalyst A before $H_2$ stripping and after $H_2$ stripping are shown in Tables VI and VII, respectively.

TABLE VI

| | Activities Before H2 Stripping | |
|---|---|---|
| | EXAMPLE 1 | EXAMPLE 2 |
| After Line-out on Low-Nitrogen Feedstock | | |
| Hydrogenation Rate Constant | 3.0 | 2.1 |
| % Conversion of 320° F.+ fraction | 26 | 27 |
| After Exposure to 6 ppm N Feedstock for 8 days | | |
| Hydrogenation Rate Constant | 1.7 | 1.4 |
| % Conversion of 320° F.+ fraction | 20 | 26 |
| After Exposure to 6 ppm N Feedstock for 8 days and 32 ppm N Feedstock for 4 days | | |
| Hydrogenation Rate Constant | 1.1 | 1.2 |
| % Conversion of 320° F.+ fraction | 19 | 23 |
| After Exposure to 6 ppm N Feedstock for 8 days and 32 ppm N Feedstock for 6 days | | |
| Hydrogenation Rate Constant | 0.6 | 0.8 |
| % Conversion of 320° F.+ fraction | 10 | 15 |

TABLE VII

| | Activities After H2 Stripping | |
|---|---|---|
| | EXAMPLE 1 | EXAMPLE 2 |
| Activities prior to First Hydrogen Strip | | |
| Hydrogenation Rate Constant | 0.6 | 0.8 |
| % Conversion of 320° F.+ fraction | 10 | 15 |
| After First Hydrogen strip | | |
| Hydrogenation Rate Constant | 3.0 | 2.0 |
| % Conversion of 320° F.+ fraction | 1 | 1 |
| After Second Hydrogen strip | | |
| Hydrogenation Rate Constant | 3.6 | 2.5 |
| % Conversion of 320° F.+ fraction | 5 | 8 |
| After Third Hydrogen strip | | |
| Hydrogenation Rate Constant | 4.1 | — |
| % Conversion of 320° F.+ fraction | 8 | — |

It should be noted that in the two examples, the feedstock sulfur level of 25 ppm did not appear to be responsible for the activity declines observed upon the introduction of nitrogen-spiked feedstock because catalyst performance on the very same feedstock without the added nitrogen had been very stable.

Sulfur levels in excess of 25 ppm may noticeably decrease catalyst performance.

What is claimed is:

1. A process for the hydrogenation of aromatic hydrocarbons, which comprises the steps of:
    (a) contacting an aromatic hydrocarbon feed comprising at least about 15 wppm organic nitrogen compound, calculated as elemental nitrogen, based on said feed, at hydrogenation conditions, in a hydrogenation zone, in the presence of added hydrogen and a hydrogen sulfide partial pressure of less than about 0.5 psia to minimize cracking of said feed to lower boiling products, with a catalyst comprising a Group VIII noble metal component and a Y-type crystalline aluminosilicate zeolite, for a time sufficient to decrease the hydrogenation activity of said catalyst, and
    (b) contacting the resulting partially deactivated catalyst with a hydrogen-containing gas in the absence of said aromatic hydrocarbon feed at conditions and for a time sufficient to increase the hydrogenation activity of said partially deactivated catalyst said hydrogen treatment of step (b) is conducted intermittently during said hydrogenation process.

2. The process of claim 1 wherein said catalyst hydrogen treating conditions of step (b) include a temperature ranging from 400° to 1200° F., a hydrogen partial pressure ranging from 200 to 2500 psig, and a period of time of at least about 0.25 hours.

3. The process of claim 1 wherein said hydrogenation process is conducted in a swing reaction zone.

4. The process of claim 1 wherein said Group VIII noble metal component is present in an amount ranging from about 0.1 to about 4 weight percent, calculated as elemental metal, based on the weight of the total catalyst.

5. The process of claim 1 wherein said zeolite is present in an amount ranging from about 0.5 to about 98 weight percent, based on the total catalyst.

6. The process of claim 1 wherein said catalyst additionally comprises a support selected from the group consisting of clay, silica, alumina, silica-alumina, boria, zirconia, titania, magnesia, and mixtures thereof.

7. The process of claim 1 wherein said zeolite is an ultrastable Y-type zeolite having a unit cell size of less than about 24.5 Angstroms and wherein said Group VIII nobel metal is a palladium component and said support comprises alumina.

8. The process of claim 1 wherein said hydrogenation conditions include a temperature ranging from about 200° to about 600° F. and a total pressure ranging from about 200 to about 2500 psia.

9. The process of claim 1 wherein said aromatic hydrocarbons are contained in a hydrocarbonaceous oil.

10. The process of claim 9 wherein said hydrocarbonaceous oil has an atmospheric pressure boiling point ranging from about 300° to about 1050° F.

11. The process of claim 9 or claim 10 wherein said hydrocarbonaceous oil comprises an organic sulfur contaminant and wherein prior to said hydrogenation, said hydrocarbonaceous oil is contacted with a hydrogen-containing gas at hydrorefining conditions to produce an effluent comprising a normally gaseous product containing hydrogen sulfide and a normally liquid product comprising a hydrorefined oil having a decreased amount of organic sulfur, separating said gaseous product comprising said hydrogen sulfide from said normally liquid product, and passing at least a portion of said hydrorefined oil to said hydrogenation zone.

12. The process of claim 1 wherein the catalyst resulting from step (b) is utilized as said catalyst in said hydrogenation zone of step (a).

* * * * *